United States Patent
Bordin et al.

(10) Patent No.: US 11,209,331 B2
(45) Date of Patent: Dec. 28, 2021

(54) PRESSURE SENSOR FOR A GAS-FILLED CYLINDER

(71) Applicant: SPECIAL SPRINGS S.R.L., Romano d'Ezzelino (IT)

(72) Inventors: Francesco Bordin, Caerano di San Marco (IT); Daniel Fantinato, Bassano del Grappa (IT); Massimo Fiorese, Bassano del Grappa (IT)

(73) Assignee: SPECIAL SPRINGS S.R.L., Romano d'Ezzelino (IT)

( * ) Notice: Subject to any disclaimer, the term of this patent is extended or adjusted under 35 U.S.C. 154(b) by 119 days.

(21) Appl. No.: 16/658,671

(22) Filed: Oct. 21, 2019

(65) Prior Publication Data

US 2020/0124491 A1 Apr. 23, 2020

(30) Foreign Application Priority Data

Oct. 23, 2018 (IT) .................. 102018000009688

(51) Int. Cl.
*G01L 19/08* (2006.01)
*G01L 7/18* (2006.01)

(52) U.S. Cl.
CPC ............ *G01L 19/083* (2013.01); *G01L 7/182* (2013.01)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025;
(Continued)

(56) References Cited

U.S. PATENT DOCUMENTS

| 3,526,136 A | 9/1970 | Caldwell, Sr. et al. |
| 2005/0076956 A1 | 4/2005 | Frederiksen |

(Continued)

FOREIGN PATENT DOCUMENTS

| DE | 10 2018 110 073 B3 | 5/2019 |
| EP | 0 943 908 A2 | 9/1999 |

(Continued)

OTHER PUBLICATIONS

Extended European Search Report dated Mar. 18, 2020 received in European Application No. 19 20 3852.9.
(Continued)

*Primary Examiner* — Andre J Allen
(74) *Attorney, Agent, or Firm* — Scully, Scott, Murphy & Presser, P.C.

(57) ABSTRACT

A pressure sensor for a gas-filled cylinder, which comprises a body from which a connector protrudes for coupling to an opening for filling a gas-filled cylinder with gas, a first through hole which passes through the connector and the body and a second hole which connects the first through hole to a sensor element which is connected electrically to at least one electronic board for processing a signal that can be detected by the sensor element.

10 Claims, 4 Drawing Sheets

(58) Field of Classification Search
CPC . G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16; B01D 1/0058; B01D 1/0082; B01D 1/14; B01D 1/16; B01D 1/305; B01D 2201/0407; B01D 3/065; B01D 5/006; B01D 63/08; B01D 69/06; B01D 71/02; B01D 19/00; B01D 19/04; B01D 1/20; B01D 1/30; B01D 21/262; B01D 2201/4092; B01D 2252/10; B01D 2253/112; B01D 2253/1128; B01D 2257/30; B01D 2257/302; B01D 2257/40; B01D 2257/55; B01D 2257/60; B01D 2257/602; B01D 2258/0283; B01D 2311/2642; B01D 2311/2649; B01D 2311/2669; B01D 2313/246; B01D 2313/38; B01D 29/112; B01D 3/145; B01D 3/346; B01D 45/08; B01D 45/16; B01D 46/0093; B01D 47/06; B01D 53/02; B01D 53/12; B01D 53/64; B01D 53/75; B01D 53/92; B01D 5/0003; B01D 5/009; B01D 61/025; B01D 61/04; B01D 61/06; B01D 61/08; B01D 61/10
USPC .............................. 337/1–417; 73/700–756
See application file for complete search history.

(56) References Cited

U.S. PATENT DOCUMENTS

| | | | |
|---|---|---|---|
| 2013/0333774 A1* | 12/2013 | Downie | G01L 9/0022 |
| | | | 137/487.5 |
| 2014/0039816 A1* | 2/2014 | Van Bekkum | B65D 90/48 |
| | | | 702/55 |
| 2014/0048069 A1* | 2/2014 | Fattah | A62B 9/006 |
| | | | 128/204.21 |
| 2014/0130799 A1* | 5/2014 | Stenzler | A61M 16/0051 |
| | | | 128/203.14 |
| 2014/0157890 A1* | 6/2014 | Malinen | A62C 37/50 |
| | | | 73/299 |
| 2019/0134536 A1* | 5/2019 | Wilkes | F02M 37/0076 |
| 2020/0122187 A1* | 4/2020 | DiStefano | B05C 11/1026 |

FOREIGN PATENT DOCUMENTS

| | | |
|---|---|---|
| EP | 2 634 451 A1 | 9/2013 |
| JP | S61-167830 A | 7/1986 |
| WO | 2019/206442 A1 | 10/2019 |

OTHER PUBLICATIONS

European Communication dated Oct. 29, 2020 received in European Application No. 19 20 3852.9.
European Communication dated Sep. 7, 2021 received in European Application No. 19 203 852.9.

* cited by examiner

PRESSURE SENSOR FOR A GAS-FILLED CYLINDER

The present invention relates to a pressure sensor for a gas-filled cylinder.

The invention relates to a pressure sensor for a gas-filled cylinder which can be applied in the sector of pressing sheet metal. In particular, it is useful for measuring the internal pressure of the gas-filled cylinders often used in forming presses.

Gas-filled cylinders are generally defined by a tubular gas containment jacket, which is closed hermetically at one end by a first head, with a hole for the passage of a stem with piston and configured to define a guide for the translation of this stem inside the jacket, and at the other end by a second head, provided with a gas charging valve; the jacket and the two heads define the travel space for the piston, while the piston, with the jacket and the second head, defines the chamber for the pressurized gas.

When such cylinders are installed in forming presses, the pressures of the chamber for the gas are typically comprised between 100 bar and 200 bar.

Owing to the high pressure levels, the operating conditions of the cylinders are difficult to manage and can lead to damage to and jamming of the cylinders and consequent damage to the equipment and to the products being machined.

The need is therefore widely felt to monitor the pressure level of the pressure chamber of cylinders during mechanical machining, i.e. in real time, or during the maintenance of the presses.

During maintenance, the cylinders are usually removed from the presses and their initial force is measured (indirect measurement of the pressure). This entails lengthy times for checking the cylinders during normal maintenance operations on the presses.

To measure the pressure, it appears to be possible to temporarily associate a pressure sensor with each cylinder, with instantaneous display of the pressure level, with LED and/or digital readout.

This solution is not devoid of drawbacks.

The most prominent of these is the fact that the sensors nowadays in use are not designed exclusively for working with cylinders, and when they are connected to them they prevent the cylinder from being filled with gas, or they do not permit measurement of the pressure with the cylinder already filled.

The aim of the present invention is to provide a pressure sensor which is capable of improving the known art in one or more of the above mentioned aspects.

Within this aim, an object of the invention is to provide a pressure sensor that makes it possible to monitor the pressure level in a gas-filled cylinder, in a simple, rapid and immediate manner, directly at the cylinder.

Another object of the invention is to enable the measurement of the pressure in the cylinder even when this is filled.

Another object of the invention is to provide a pressure sensor that is highly reliable, easy to implement and of low cost.

This aim and these and other objects which will become better apparent hereinafter are achieved by a pressure sensor for a gas-filled cylinder, which comprises a body from which a connector protrudes for coupling to an opening for filling a gas-filled cylinder with gas, a first through hole which passes through said connector and said body and a second hole which connects it to a sensor element which is connected electrically to an electronic board for processing the signal that can be detected by said sensor element.

Further characteristics and advantages of the invention will become better apparent from the description of two preferred, but not exclusive, embodiments of the pressure sensor according to the invention, illustrated, by way of non-limiting example, in the accompanying drawings wherein.

Figure 2:
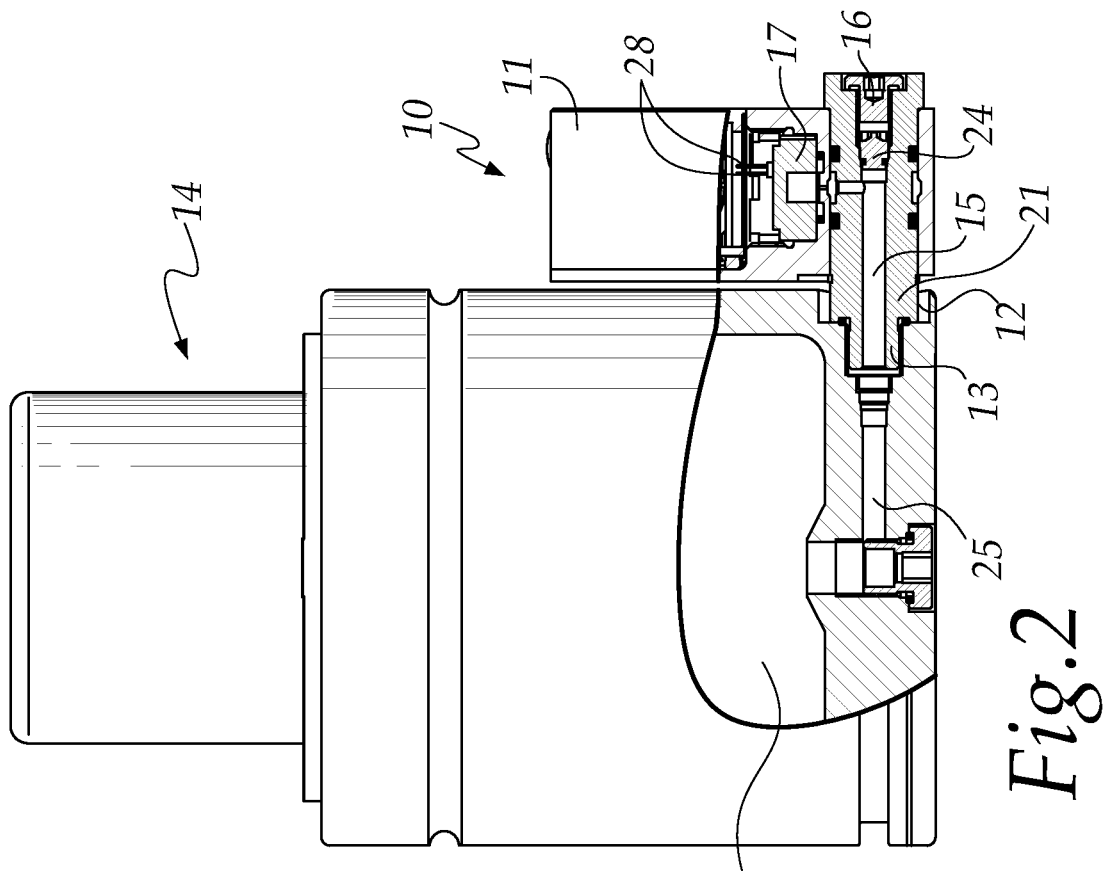
FIG. 2 is a partially cross-sectional side view of the sensor according to the invention, in a first embodiment thereof, again applied to a gas-filled cylinder.

With reference to the figures, the pressure sensor according to the invention, generally designated by the reference numeral 10, comprises a body 11 near the bottom of which a connector 12 protrudes laterally, with a coupling portion 13, for coupling to an opening for filling a gas-filled cylinder 14 with gas. In the sensor 10 there is also a first through hole 15, which passes through the connector 12 and the body 11, and a second hole 16 connects the first through hole 15 to a sensor element 17, of a sensor body 18, which is connected with at least one electronic board 19 for processing a signal that can be detected by the sensor element 17.

The connector 12 is threaded complementarily to the opening for filling the gas-filled cylinder 14. In particular, the complementary threading is present on the coupling portion 13.

The pressure sensor 10 conveniently also comprises a safety plug 20 which is adapted to close the first hole 15 on the opposite side with respect to the connector 12.

The first hole 15 and the second hole 16 are provided in a perforated screw element 21 to be inserted transversely into the body 11.

Such screw element 21 is provided with two circular grooves on opposite sides with respect to the second hole 16 and in each of which seals 22 are conveniently mounted (shown in FIG. 3), in order to prevent leaks of gas from passing from the screw element 21 to the sensor body 18.

The screw element 21 is provided with a hexagonal head 23 with which it protrudes from the body 11 at the other end with respect to the connector 12, and the safety plug 20 is inserted into the head 23 and is conveniently provided with a guiding portion that is contoured for an end of an Allen key with which to screw it into the head 23.

The sensor 10 and 110, respectively in the first and in the second embodiment, is adapted to interact with a safety valve 24, 124, which is adapted to prevent the passage of gas in output from the cylinder 14.

Figure 3:
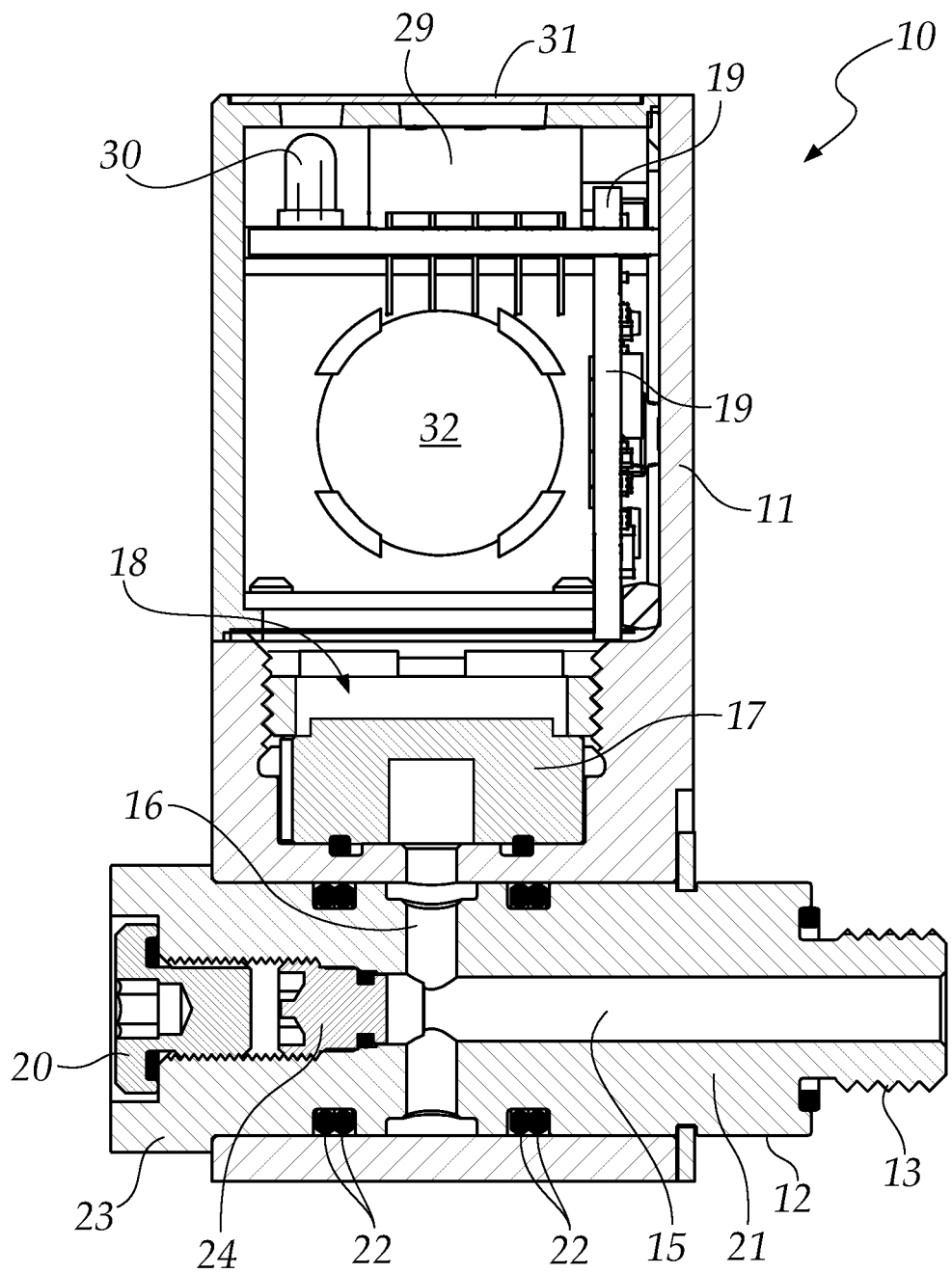
FIG. 3 is another cross-sectional view of the sensor according to the invention, again in its first embodiment.

In particular, in the first embodiment, which is shown in cross-section in FIGS. 2 and 3, the valve 24 is installed inside the first hole 15, between the safety plug 20 and the second hole 16. In this case, the seal occurs inside the hole 15, because the valve occludes it, thus preventing the passage of gas in output. This configuration is well adapted to gas-filled cylinders 14 in which there is no valve at the inlet of a gas-filling channel 25 that leads to the pressure chamber 26 containing the gas.

The second embodiment is generally designated with the reference numeral 110 and has many parts in common with the first, with which it shares the same reference numerals, differing from it exclusively in the absence of the valve in the first hole 15 and in the presence of a needle element.

Figure 4:
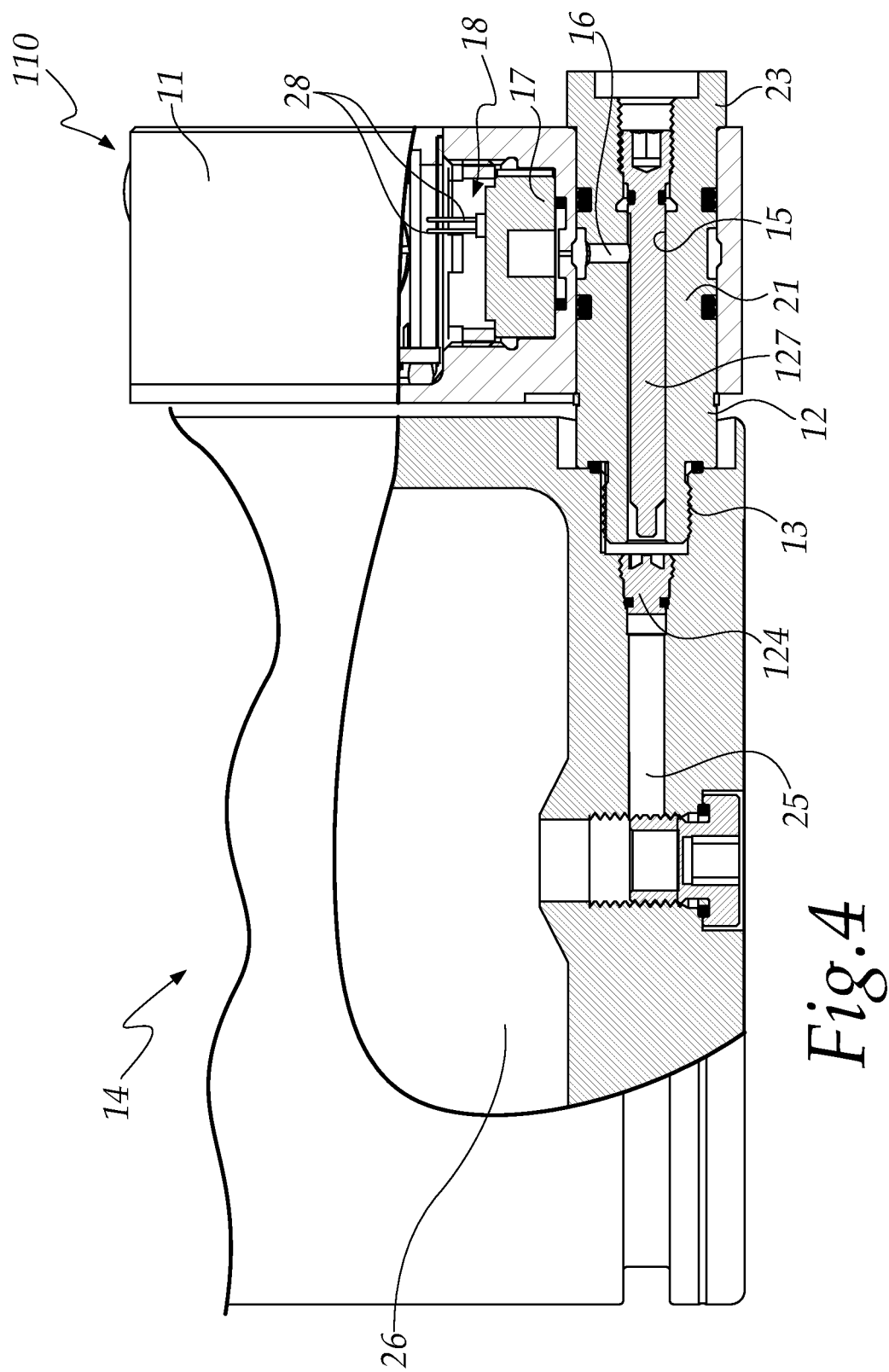
FIG. 4 is a cross-sectional view of the sensor according to the invention, in a second embodiment thereof and in a first configuration of use.
Figure 5:
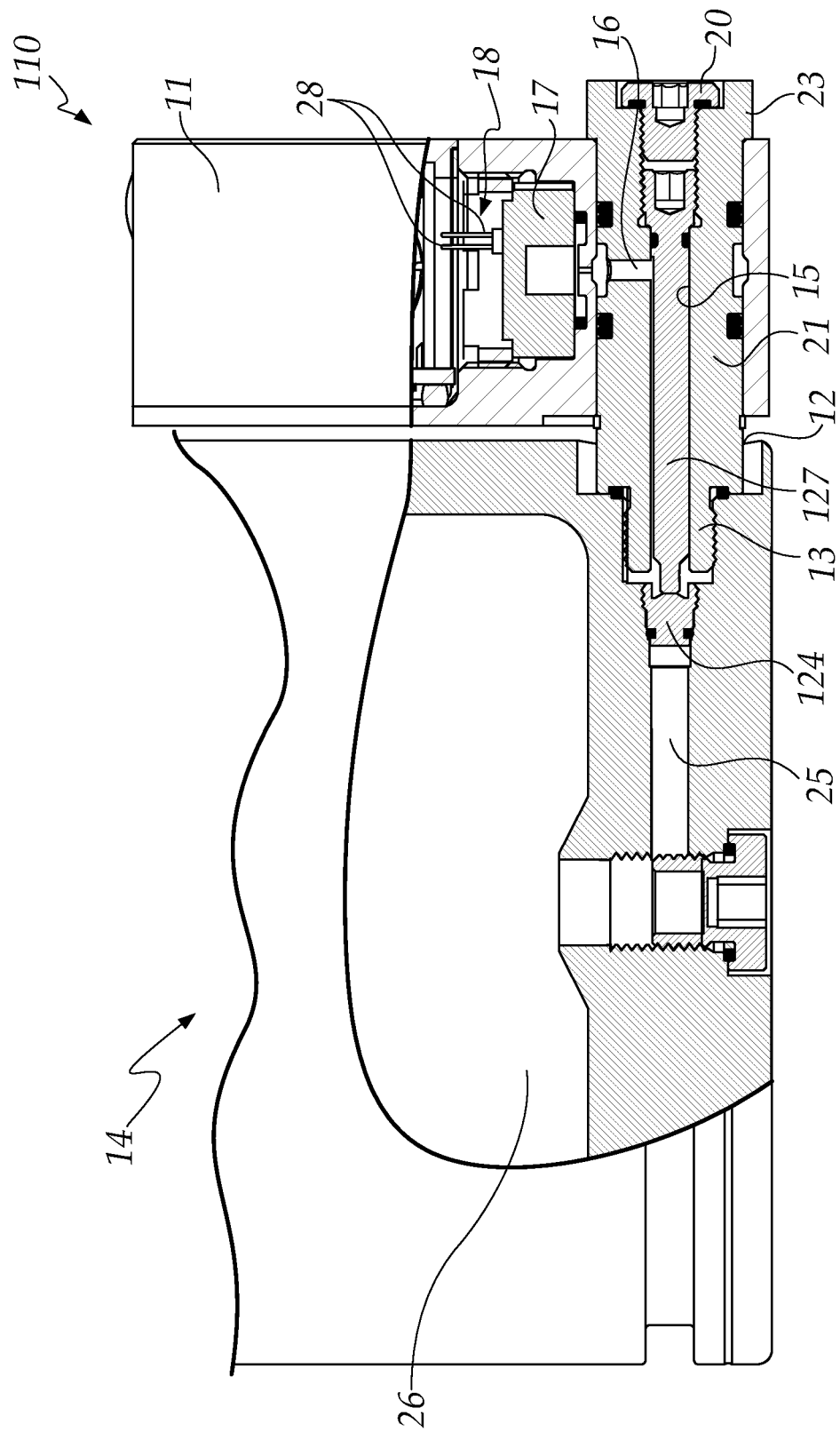
FIG. 5 is the same cross-sectional view in FIG. 4, of the same sensor, in a second configuration of use.

In particular, according to such an embodiment, shown in FIG. 4 and in FIG. 5, the pressure sensor 110 comprises a needle element 127 which is accommodated in the first hole 15 and is adapted to be pushed against the valve 124 which is present substantially at the inlet of a channel 25 for filling the gas-filled cylinder 14 with gas. With the push, the valve 124 is adapted to open, thus connecting the pressure chamber 26 with the sensor body 18.

In this case the seal occurs outside the first hole 15, in front of the end of the head 23, since the valve 124 is part of the gas-filled cylinder 14 and not of the pressure sensor 110.

According to the embodiments, the sensor element 17 is conveniently connected, for example by way of a pin 28, to the electronic part, in order to bring the pressure signal to the electronic board 19, which is designed to convert the signal, in so doing quantifying it.

Figure 1:
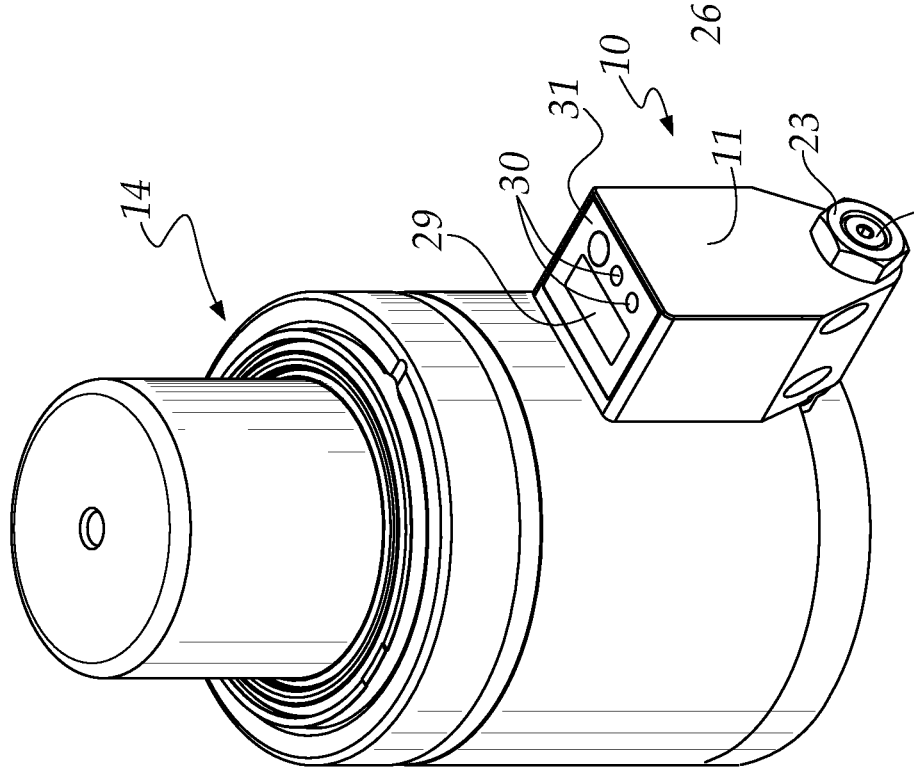
FIG. 1 is a perspective view of a sensor according to the invention, applied to a gas-filled cylinder.

The sensor, as shown in FIG. 1, where it is designated with the reference numeral 10 of the first embodiment, but positively also for the second embodiment 110, comprises a screen 29 which is connected electrically to the electronic board 19, and is adapted to show at least the pressure level processed by the card, and also comprises a pair of LEDs 30 which are connected electrically to the electronic board 19. The LEDs 30 and the screen 29 are installed underneath a transparent protective cover 31. Conveniently, there is also a battery 32, shown in FIG. 3.

Operation of the pressure sensor according to the invention is the following.

In its first embodiment, the sensor 10 is connected to the gas-filled cylinder 14 by inserting the connector 12 into the opening for filling the cylinder.

The safety plug 20 is removed and the cylinder 14 is filled through the head 23, since the first hole 15 is a through hole. The introduction of gas, preferably nitrogen, causes the opening of the valve 24, which permits the gas to pass through the first hole 15 toward the cylinder 14. The filling can take place using equipment that is already used currently.

Since the hole 15 is connected to the second hole 16, the gas also rises toward the sensor body 18.

The pressure is detected by the sensor element 17 and processed by the electronic board 19, which returns its value through the screen 29 or, by switching on one of the two LEDs 30, indicates whether it is higher than the threshold value (for example by switching on a green LED) or lower (for example a red LED).

The pressure sensor 10 can be connected permanently to the cylinder, which can be filled through the screw element 21, and therefore it makes it possible to know the pressure level at any time, thus reducing the times for the maintenance and checking of the presses.

In the second embodiment, the cylinder 14 is already filled and the valve 124 prevents the gas from exiting.

After connecting the sensor 110 to the gas-filled cylinder 14, by inserting the connector 12 into the opening for filling the cylinder with gas, the operator can act on the head of the needle element 127 by way of an Allen key. By screwing it, the needle element 127 is moved toward the cylinder and pushes the valve 124, opening it and therefore allowing the passage of the gas. The gas passes from the pressure chamber 26 to the sensor body 18, reaching the first hole 15 and the second hole 16 and, as in the previous case, its pressure level is detected. The transition of the needle element 127 from one position to the other can be detected by comparing the two configurations shown in FIGS. 4 and 5. As shown in FIG. 5, after opening the gas passage, the needle element 127 can be left in the pushed position of the valve 124 and the safety plug 20 is applied.

The sensor 110 can also be removed after detecting the pressure, for example if its presence is not allowed for construction reasons, after pulling back the needle element 127 in order to close the valve 124.

In this embodiment, the sensor 110 can also be fitted on gas-filled cylinders 14 that are filled, thus enabling them to be checked with insignificant variations of charge owing to the passage of the gas from the pressure chamber to the sensor, while leaving the cylinder mounted on the press.

In practice it has been found that the invention fully achieves the intended aim and objects by providing a pressure sensor for a gas-filled cylinder with which it is possible to monitor in a continuous and simple and immediate manner the pressure level directly at the cylinder and which, furthermore, does not need to be removed from the cylinder in order to fill the latter with gas.

The invention thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102018000009688 from which this application claims priority are incorporated herein by reference.

What is claimed is:

1. A pressure sensor for a gas-filled cylinder comprising:
a body having a connector for coupling to an opening for filling the gas-filled cylinder with gas, wherein the connector protrudes from the body,
a sensor; and
at least one electronic board, wherein the at least one electronic board is configured to process a signal detected by said sensor,
wherein a first through hole that passes through said connector and said body and a second hole that connects the first through hole to the sensor, which is connected electrically to the least one electronic board.

2. The pressure sensor according to claim 1, wherein said connector is threaded complementarily to the opening for filling said gas-filled cylinder.

3. The pressure sensor according to claim 1, further comprising a safety plug which is adapted to close said first through hole on an opposite side with respect to said connector.

4. The pressure sensor according to claim 1, wherein said first through hole and said second hole are provided in a perforated screw element to be inserted transversely into said body.

5. The pressure sensor according to claim 3, wherein said safety plug is inserted into a head of said screw element with which said screw element protrudes from said body.

6. The pressure sensor according to claim 1, wherein the pressure sensor is adapted to interact with a valve, wherein the valve is adapted to prevent a passage of gas in output from said gas-filled cylinder.

7. The pressure sensor according to claim 6, wherein said valve is installed inside said first through hole between said safety plug and said second hole.

8. The pressure sensor according to claim 6, further comprising a needle element which is accommodated in said first through hole and is adapted to be pushed against said valve which is present at an inlet of a channel for filling the gas-filled cylinder with gas.

9. The pressure sensor according to claim 1, further comprising a screen which is connected electrically to said at least one electronic board, and which is adapted to show at least a pressure value processed by said board.

10. The pressure sensor according to claim 1, further comprising at least one LED which is connected electrically to said at least one electronic board.

\* \* \* \* \*